United States Patent [19]

Palazzo

[11] Patent Number: 5,664,313

[45] Date of Patent: Sep. 9, 1997

[54] METHOD OF MAKING DOUBLE-WALL TANK FOR THE STORAGE OF LIQUIDS

[76] Inventor: David T. Palazzo, P.O. Box 290676, Tampa, Fla. 33687

[21] Appl. No.: 546,739

[22] Filed: Oct. 23, 1995

[51] Int. Cl.⁶ .................................................. B23P 17/00
[52] U.S. Cl. ............................ 29/455.1; 29/423; 29/458; 220/445
[58] Field of Search .................... 29/423, 455.1, 29/458, 460; 220/445, 453, 457, 469, 420

[56] References Cited

U.S. PATENT DOCUMENTS

| Re. 34,203 | 3/1993 | Palazzo | 220/445 |
|---|---|---|---|
| 3,412,891 | 11/1968 | Bastone et al. | 220/83 |
| 4,394,931 | 7/1983 | Cotgreave et al. | 220/453 |
| 4,552,281 | 11/1985 | Schneider | 220/457 X |
| 4,588,622 | 5/1986 | Sukarie | 428/35 |
| 4,655,367 | 4/1987 | Palazzo | 220/445 |
| 5,102,005 | 4/1992 | Trussler | 220/4.12 |
| 5,167,353 | 12/1992 | Robbins | 220/402 |
| 5,476,189 | 12/1995 | Duvall et al. | 220/446 X |

*Primary Examiner*—S. Thomas Hughes
*Attorney, Agent, or Firm*—C. Douglas McDonald, Jr. & Associates, P.A.

[57] ABSTRACT

A method is disclosed for manufacturing from a rigid single-wall tank having spindle members attached to and extending outwardly of each of its end portions a rigid double-wall tank for the storage of liquids. The method includes applying to the exterior surface of the inner tank a spacing material, applying over the inner tank and the spacing material an outer sheath with at least a portion of the outer sheath applied adjacent to each spindle member then removing at least one of the spindle members from the end portions of the inner tank and urging the outer sheath overlying the end portions away from the end portions to form a space between the end portion of the inner tank and the outer sheath, inserting into the spacing material and then sealing the end portion of the inner tank by applying a substantially liquid-tight sheath. From this method there results a rigid double-wall storage tank having an outer sheath spaced from the outer surface of the inner tank along at least a portion of cylindrical side walls and the end portions of the inner tank.

18 Claims, 4 Drawing Sheets

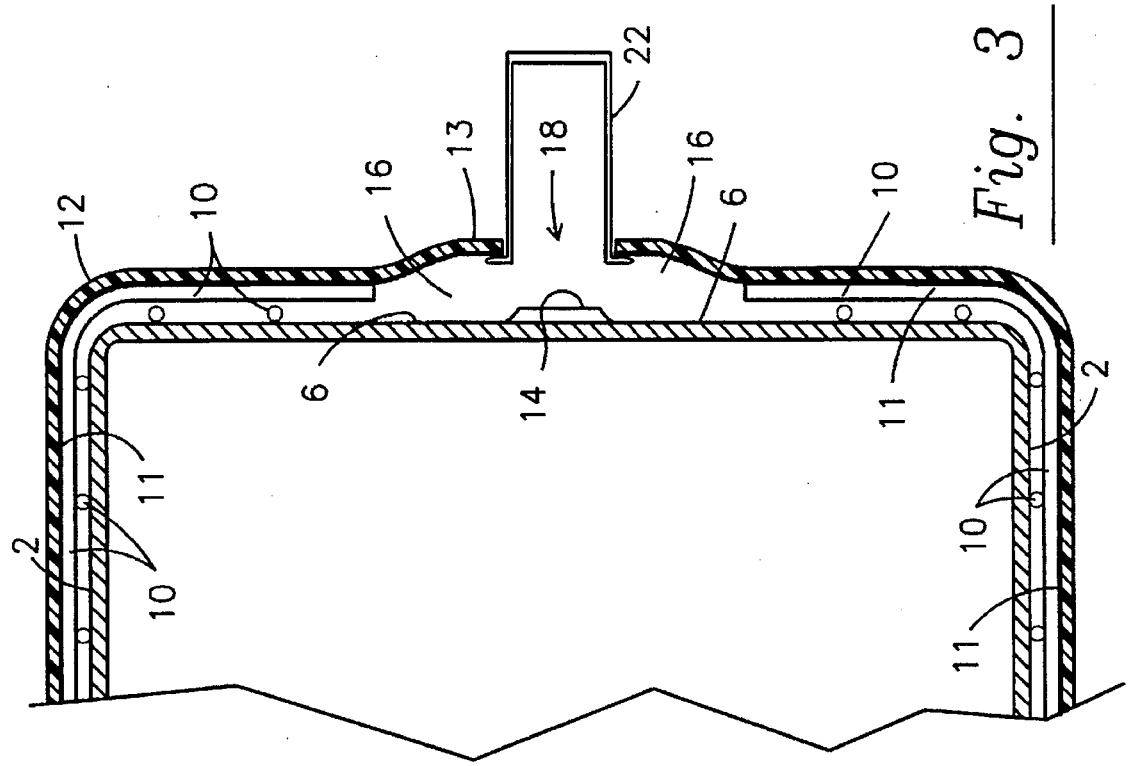
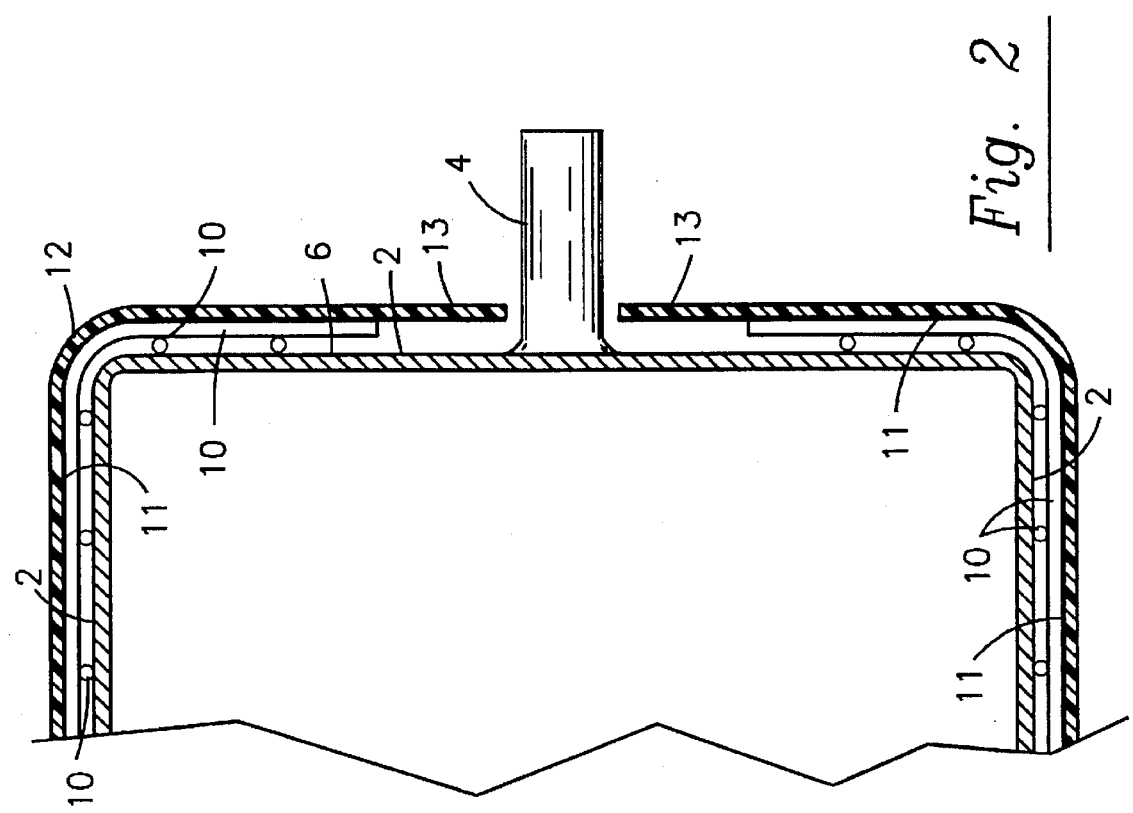

METHOD OF MAKING DOUBLE-WALL TANK FOR THE STORAGE OF LIQUIDS

BACKGROUND OF THE INVENTION

This invention relates to tanks for the storage of liquids, and, more particularly, to double-wall tanks for underground storage of liquids.

There are currently numerous ways and a variety of materials from which tanks for the storage of liquids are constructed. In one common application, the underground storage of hydrocarbons, such as gasoline and other petroleum products, the tanks have conventionally been fabricated out of steel or fiberglass. Because the earlier tanks were generally fabricated out of a single rigid wall, the increasing age of many of these tanks is beginning to present serious environmental dangers. In addition, many of the older steel tanks buried underground have rusted and are beginning to leak, releasing the petroleum materials into the ground where they may seep into and pollute underground water supplies. Even fiberglass tanks, being generally rust proof, have also exhibited leakage causing similar problems.

One of the main problems with leaking storage tanks has been the difficulty or inability to ascertain when or if such leaks are occurring from a given tank. Because the excavation and removal of such a storage tank, which may contain thousands of gallons of fuel, is an expensive and difficult undertaking, such an operation is difficult to justify unless there is some evidence of actual leakage. Because of the increasing potential danger of leaking storage tanks, particularly in those communities utilizing underground water for public consumption, many municipalities have implemented or plan to implement ordinances requiring the use of double-wall storage tanks and requiring replacement of existing single-wall tanks. While the installation of the conventional double-wall storage tank in a new facility entails no great difficulty and a generally manageable increase in cost over a single-wall tank, the burden of complying with such ordinances by replacing existing sound, single-wall tanks with double-wall tanks can be heavy. This burden has prompted the search for methods of fabricating relatively inexpensive double-wall tanks including remanufacturing existing single wall tanks into a double wall assemblies. One common approach to manufacturing such a double wall tank is preparing a previously used single wall tank by resurfacing and coating it with an appropriate corrosion resistant material, such as the method disclosed in U.S. Pat. No. 4,817,817 to David T. Palazzo, the inventor of the present invention, which is specifically incorporated by reference as though fully set forth herein.

This burden has also given impetus to the search for a method of manufacturing a double-wall assembly having means for detecting the presence of any leaks into the space between two walls. Within the last decade, this search has resulted in several double-wall storage tanks and methods for making them including suitable means for detecting the presence of fluids between the walls of a double-wall tank. Suitable illustration of such double wall tanks having appropriate leak detection devices may be found in the following U.S. Pat. Nos. 4,640,439; 4,644,627; 4,655,367; 4,744,137; and 4,780,947, all of which are invented by David T. Palazzo, the inventor of the present invention, and are incorporated by reference as though fully set forth herein. These patents generally are directed to double wall tanks having a spacing material interposed between the exterior surface of an inner tank and a substantially rigid outer sheath, which tank may further incorporate appropriate devices to detect leaks as well as introduce and withdraw liquids from the tank. In such double wall tank constructions, it is desired to provide a double wall tank that permits substantially free passage of liquids between the outer sheath and the inner tank.

In particular, during the conventional manufacture of such double wall tanks, the outer sheath often bonds to the end portions of the inner tank inhibiting the desired free flow of liquids along the exterior surface of the inner tank. To address this problem U.S. Pat. No. 4,655,367 discloses a method for manufacturing a double-wall storage tank utilizing what is commonly referred to as a formed end cap construction, illustrating the importance of providing free flow of liquids along the end portions of a double-wall tank. This end cap construction, while addressing many of the concerns associated with constructing a double wall tank having the necessary fluid flow along its end portions, requires the additional manufacturing of the end caps as well as added costs.

SUMMARY OF THE INVENTION

In light of the foregoing, this invention relates to a method of manufacturing a double-wall tank for the storage of liquids, particularly providing an improved method of manufacturing the end wall portion of a double-wall tank. This method includes the steps of providing a rigid single-wall inner tank for the storage of liquids having generally cylindrical side-wall portions and closed end portions that are generally transverse to the side-wall portions. The inner tank includes elongated spindle members that extend outwardly from its end portions, generally coaxially with the central axis of the cylindrical inner tank. A spacing material is applied over a substantial portion of the exterior surface of the inner tank in order provide free passage of liquids along a substantial portion of the exterior surface of the inner tank. An outer sheath, preferably of a substantially rigid and liquid-tight material, is applied over the spacing material and the inner tank with at least a portion of this sheath applied adjacent to each of the spindle members. At least a substantial portion of at least one spindle member is then removed from the end portions of the inner tank. Next, the portion of the outer sheath proximal the remaining spindle stub is urged away from the end portion of the inner tank such that it forms a space between the outer sheath and the end portion of the inner tank. An opening in the end portion of the outer sheath surrounding the spindle member is also formed. Additional spacing material is inserted through this opening and into the space between the outer sheath and the exterior surface of the inner tank. A liquid-tight material is then applied over this aperture and bonded to the outer sheath, thereby providing for improved free flow of liquids between the end portion of the inner tank and the overlying outer sheath.

BRIEF DESCRIPTION OF THE DRAWINGS

In order to more fully understand the nature and advantages of the present invention, reference should be made to the following illustrations in which:

FIG. 2 is a partial side sectional view of the tank of FIG. 1, particularly illustrating the end portion;

FIG. 3-5 are partial side sectional views of the end portion of the tank of FIG. 1 illustrating various steps in the fabrication process.

DETAILED DESCRIPTION

Figure 1:
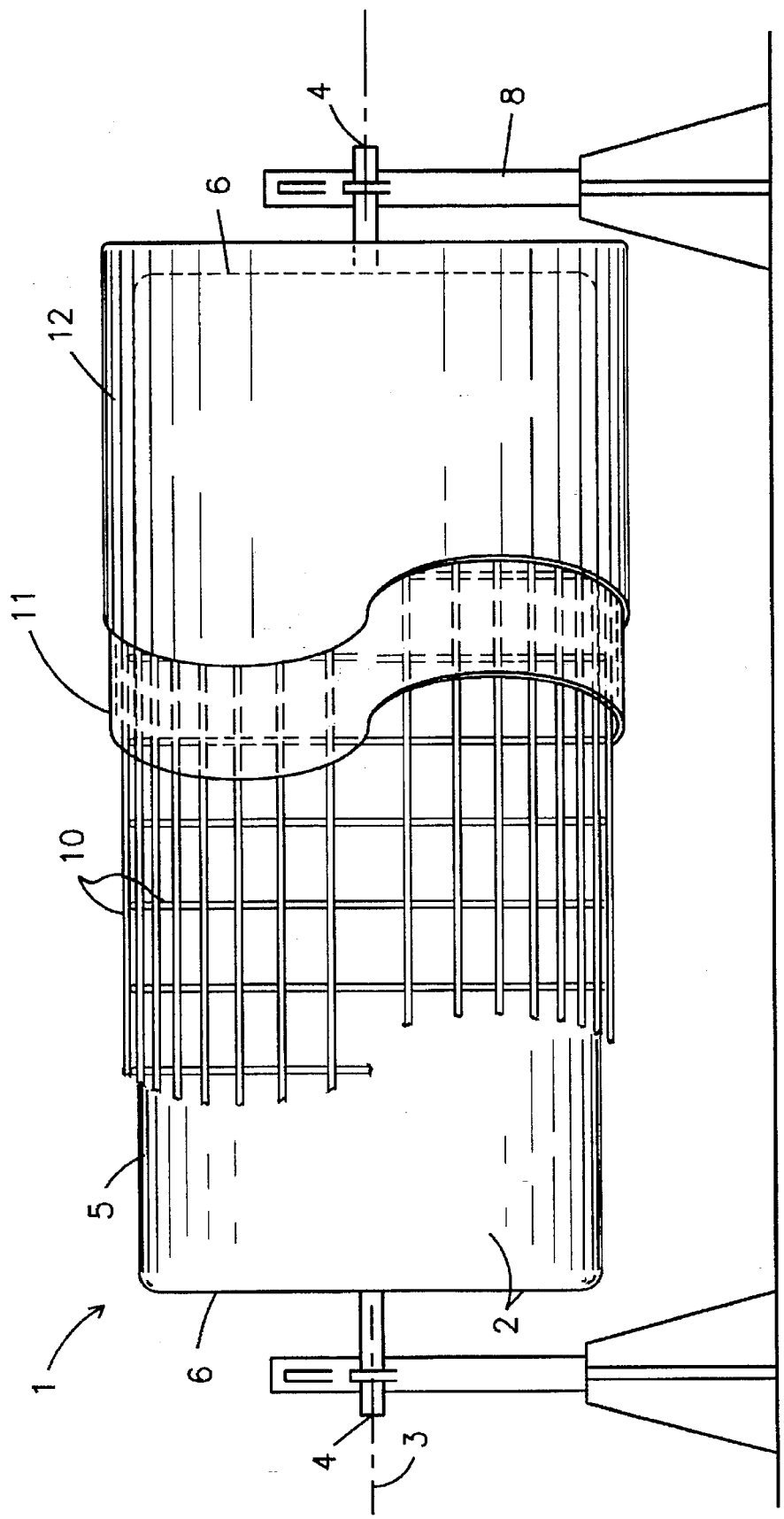
FIG. 1 is a side elevation, partially in section, of a preferred embodiment of a tank being manufactured in accordance with the present invention.

A preferred embodiment of a storage tank produced in accordance with the method of the present invention is illustrated in FIGS. 1-6. FIG. 1 is a side elevational view generally illustrating the manner of making a double wall tank assembly by the application of various materials to the inner storage tank 1, up to the point of completing the end portion of the outer sheath of the assembly.

While various forms and shapes of tanks may be utilized in practicing this invention, the most common and preferred shape utilized for underground storage is that of generally cylindrical sidewalls and closed end portions that are substantially transverse to the sidewalls. For simplicity of illustration, a tank having a right circular cylinder configuration is utilized for showing the preferred embodiment of this invention. While inner tank 1 may be formed of any suitable material, such as metal or fiberglass, a preferred type of tank structure is a welded steel construction having desirable characteristics of strength and rigidity as well as being coated with appropriate corrosion resistant materials on its contacting surfaces. Inner tank 1 may be a newly fabricated tank, which may or may not have a manhole opening in it, or it may be a previously used tank removed from its prior underground installation.

In the situation where a previously used tank is used, it is desirable that the exterior surface be conventionally sandblasted and coated with a rust inhibitive paint. Once the previously used tank has been prepared, the remaining manufacturing steps proceed in substantially the same manner as for a newly fabricated tank.

As is shown in FIG. 1, spindle members 4 are attached, such as by welding, to the end portions 6 of the inner tank 1 and are aligned substantially coaxially with the central axis 3 of the cylindrical inner tank 1. These spindle members 4 extend outwardly from the end portions 6 in such a manner that the inner tank 1 may be supported off the ground by conventional tank supporting members 8, shown in FIG. 1. This provides for convenient rotation of the tank about its axis 3 in order to facilitate the method of this invention as is set forth below.

With the inner tank supported by spindle members 4, a spacing material 10 is applied to at least a portion, preferably at least the lower portion, of the exterior surface 2 of the inner tank 1. Due to the ease at which the tank may rotate about its axis, the spacing material 10 may conveniently be applied to the entire exterior surface 2 of the inner tank 1. This spacing material 10 may comprise any suitable material that provides substantially free passage of liquid along at least a substantial portion of the exterior surface 2 of the inner tank 1. In the preferred embodiment of FIG. 1, the spacing material 10 may comprise a perforate material such as, for example, an open wire mesh. This may suitably be the type of mesh conventionally used in reinforcing concrete structures, although other types of spacing material that have solid portions separated by and defining voids may also be used. Such a spacing material 10 could also comprise a sheet or coating of a porous material, a synthetic resin mesh or a plurality of substantially rigid rods.

When the spacing material 10 is applied to the exterior surface 2 of the inner tank 1, regardless of which material is used, the spacing material 10 is preferably extended over the end portion 6 proximal the spindle members 4. It is to be understood that the spacing material 10 may be laid over the inner tank 1 and be held by strapping or other convenient manner as to simply hold it in place temporarily during the application of the outer sheath described below.

The outer sheath of the tank of this invention may be fabricated in a number of different ways. One advantageous method comprises the wrapping of the exterior cylindrical sidewall portions 5 and end portions 6 of the tank with a web of imperforate material such as a sheet 11 of synthetic resin, such as a polyethylene film or the like, that is stretched over the exterior surfaces of inner tank 1, preferably including the end portions, as the tank is rotated on its spindle members 4. This application of stretched sheet 11 over the spacing material 10 prevents the subsequently applied outer sheath from contacting those portions of the inner tank 1 over which the spacing material 10 is applied. Various other materials could likewise be substituted in place of the stretched sheet 11 to support the subsequent layers of sheath. Additionally, with appropriate selection of materials used in fabricating the sheath, such as those described in my prior patent listed in the Background of the Invention, above, it is also possible to dispense with the use of this stretched sheet 11.

In this preferred embodiment the rigid outer sheath preferably is formed by conventionally applying the outer sheath over the stretched sheet 11, the spacing material 10 and the inner tank 1 such that the outer sheath 10 is spaced from at least a portion of the exterior surface of the inner tank 1 by the spacing material 10. The outer sheath preferably comprises a liquid-tight, imperforate material such as, for example, a sheet of synthetic resin or resin impregnated glass fiber mats. Preferably, such resin impregnated glass fiber is directly sprayed onto the tank by what is commonly known as a "chopper gun" as the tank rotates about its axis 3. Glass fiber mats may also be laid and wrapped around the end portion 6 of the tank with equal facility. As shown in FIGS. 1 and 2, it is preferred that the outer sheath 12 form a substantially continuous outer sheath 12 overlying both the cylindrical sidewall portions 5 and the end portion 6 with at least a portion of the outer sheath 12 being adjacent to each of the spindle members 4. If no spacing material 10 has been applied to the end portion 6 of the tank, the end portions 6 may be coated with a conventional release agent to prevent the outer sheath 12 from permanently bonding to the end portion 6 of the inner tank 1.

FIG. 2, illustrates a partial sectional view of an end portion 6 of a tank including outer sheath 12 overlying the stretched sheet 11 and the spacing material 10 that are applied over the exterior surface 2 of inner tank 1. For simplicity of illustration, only one end portion has been included in FIGS. 2-5, but it will be understood that the method of the present invention applies equally to both end portions 6 of the tank.

The next step of the present invention includes removing, such as by cutting, a substantial portion of the length of at least one spindle member 4 that extends outwardly from the tank. As shown in FIG. 3, each spindle member 4 is removed at a point along its length proximal with the end portion 13 of outer sheath such that the remaining spindle stub 14 preferably is substantially even with the end portion 13 of outer sheath 12. The end portion 13 of the outer sheath adjacent to the remaining spindle stub 14 is then urged away from the end portion 6 of the inner tank 1 to form a space 16 between the end portion 6 of inner tank 1 and the end portion 13 of the outer sheath 12. While FIG. 3 illustrates a mechanical apparatus physically urging the outer sheath 12 away from the end portion 6, it will be understood that this is only indicative of the principle of urging the end portion 13 of outer sheath away, and that other methods may be employed with equal facility to form the space 16 into which the spacing material will be inserted.

As a result of urging the outer sheath 12 away from the inner tank 1 an aperture 18 is created surrounding the remaining spindle stub 14 through which a suitable spacing material 20 is inserted into space 16. This spacing material 20 spaces the end portion 13 of the outer sheath 12 from the end portion 6 of the inner tank 1, providing for substantially free passage of liquids along the end portion 6 of the inner tank 1 proximal the remaining spindle stub 14. Similarly to spacing material 10, spacing material 20 preferably comprises a perforate material such as an open wire or synthetic resin mesh or a plurality of substantially rigid rods. In the preferred embodiment illustrated in FIG. 4., spacing material 20 is inserted into space 16 substantially adjacent to spacing material 10.

Figure 5:
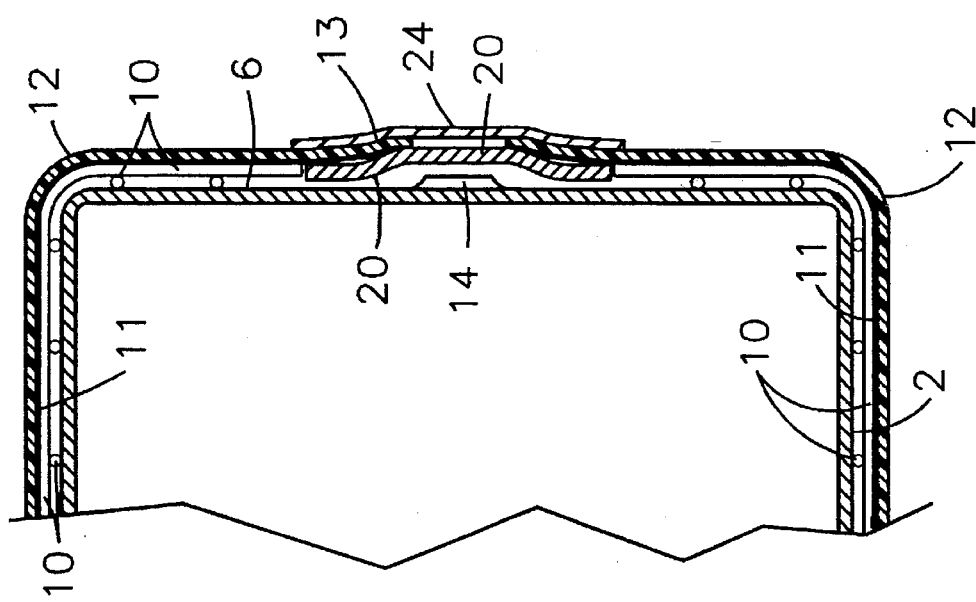
Figure 4:
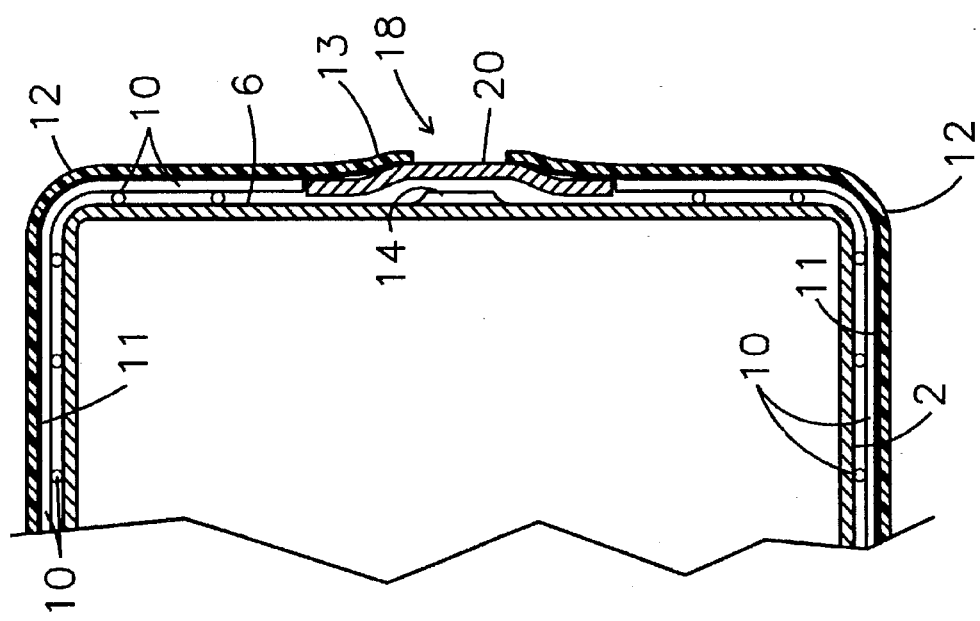
Figure 6:
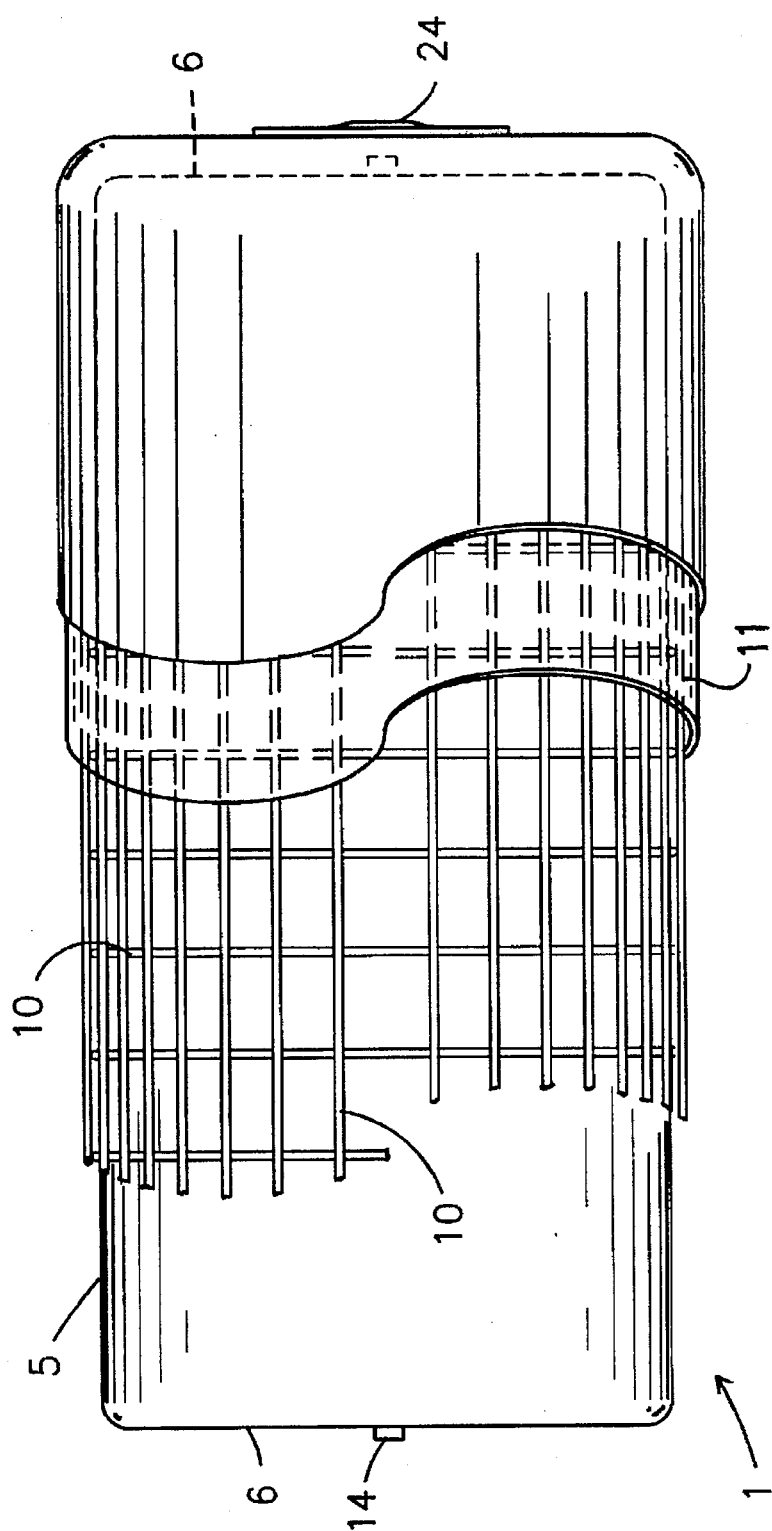
FIG. 6 is a side elevation, partially in section, of a preferred embodiment of a completed tank according to the present invention.

After suitable spacing material 20 has been inserted into space 16, a substantially liquid-tight sheath is applied over the aperture 18 to provide a substantially continuous outer sheath around the inner tank, shown in FIGS. 5 and 6. Prior to applying the patch 24 over the aperture 18, however, an imperforate sheet, such as stretched sheet 11, may also be inserted into space 16 overlying the spacing material 20. This sheath preferably is in the form of a patch 24 that comprises substantially similar material to that of the outer sheath 12, such as a resin-impregnated glass fiber mat. However, any material that will provide a liquid-tight seal around aperture 18 and is of suitable rigidity and bondable to the outer sheath 12 will, of course, suffice. As illustrated in the structure of FIG. 6, there is provided a side elevational view, partially in section, of a tank manufactured according to the method of the present invention. It will be understood, however, that the final construction of the double-wall tank of this invention may depend upon the desired characteristics and intended use of the tank. Appropriate holes or openings may be formed in the cylindrical sidewall portions 5, preferably in such a manner that sealingly bonds the openings to the tank and by any suitable means such as a hole saw or the like, as described in U.S. Pat. No. 4,640,439. It is also generally desirable to provide access to the interior of the tank that is sufficiently large for a person to enter into the tank. In addition, plumbing, such as for the detection of leaks or the introduction and withdrawal of liquids from the tank, may also be incorporated into the construction of the tank, such as described in U.S. Pat. No. 4,640,439. Where such plumbing has been affixed to the tank, the outer sheath 12 is preferably bonded to the additional structures by a suitable bonding material. It will be understood and appreciated by those skilled in the art that these and other conventional accessories for use with storage tanks may be part of the tank manufactured in accordance with the method of the present invention.

By the foregoing construction there is, thus provided, a double-wall tank that can be manufactured economically and provide an outer sheath that is free of any tendency to rust or corrode. This outer sheath is spaced from the inner tank along both cylindrical sidewall portions as well as end portions to permit the collection within that space and, thus, detection of any liquids leaking into that space either from the tank or from sources exterior to the outer sheath. Thus, leakage of either the tank or the outer sheath may be determined simply by detecting the presence and nature of any liquid present in that space. In addition, the use of a relatively thick and rigid outer sheath enhances the strength of that sheath over similar structures using flexible outer covering. Consequently, the strength of the outer sheath results in an increased strength of the entire tank structure and further permits testing of the integrity of the sheath as substantial pressures, which could not be done with a flexible covering without danger of rupture.

While the foregoing describes in detail several preferred embodiments of the tank of this invention, it is to be understood that such description is illustrative only of the principles of the invention and is not to be considered limitative thereof. Because numerous variations and modifications of the method of manufacture will readily be apparent to those skilled in the art, the scope of this invention is to limited solely by the claims appended hereto.

Now that the invention has been described,

What is claimed is:

1. A method of manufacturing a double-wall tank for the storage of liquids comprising the steps of:

provide a rigid, single-wall inner tank having generally cylindrical side-wall portions and closed end portions generally transverse to said side-wall portions, said inner tank having an exterior surface and elongated spindle members being attached to and extending outwardly of each of said end portions of said inner tank generally coaxially with the central axis of said cylindrical inner tank;

applying over at least a substantial portion of said exterior surface of said inner tank a first spacing material providing for substantially free passage of liquids along a substantial portion of said exterior surface of said inner tank;

applying over said inner tank and said first spacing material an outer sheath of a material that is substantially rigid and liquid-tight with at least a portion of said outer sheath being adjacent to each of said spindle members, and said outer sheath being spaced from at least a portion of said exterior surface of said inner tank by said first spacing material;

removing from said storage tank at least a substantial portion of the length of one of said spindle members from one of said end portions of said inner tank;

urging an end portion of said outer sheath overlying said one end portion of said inner tank away from said one end portion of said inner tank to form a space between said end portion of said outer sheath overlying said one end portion of said inner tank and said one end portion of said inner tank, such that an aperture is created in said end portion of said outer sheath adjacent said one spindle member;

inserting a second spacing material through said aperture and into said space to maintain said end portion of said outer sheath overlying said one end portion of said inner tank spaced from said one end portion of said inner tank; and applying over said aperture a second sheath of a material that is substantially liquid-tight.

2. A method according to claim 1 further comprising the step of applying over said second spacing material an imperforate material to separate the subsequently applied second sheath from said second spacing material.

3. A method according to claim 2 wherein said imperforate material comprises a sheet of synthetic resin.

4. A method according to claim 1 wherein said method further comprises the steps of:

removing from said storage tank at least a substantial portion of the length of another one of said spindle members from its respective said end portion of said inner tank;

urging another end portion of said outer sheath away from the respective said end portion of said inner tank to form a second space between said another end portion of said outer sheath and its respective end portion of said inner tank, such that a second aperture is created in said another end portion of said outer sheath;

inserting into said second space additional second spacing material to maintain said another end portion of said outer sheath spaced from its respective said end portion of said inner tank; and applying over said second aperture additional of said second sheath material.

5. A method according to claim 4 wherein said spindle removing steps further comprise removing outwardly extending portion of each of said spindle members from the respective said end portions of said inner tank at a point along each of said spindle members proximal with the outer surface of the respective said end portions of said outer sheath.

6. A method according to claim 5 wherein said point along each of said spindle members is substantially even with the outer surface of the respective said end portions of said outer sheath.

7. A method according to claim 1 wherein said second spacing material further comprises a perforate material.

8. A method according to claim 7 wherein said perforate material comprises a mesh material.

9. A method according to claim 1 wherein said second spacing material comprises a plurality of substantially rigid rods.

10. In a method of making a double-wall storage tank that includes the steps of providing a rigid, single-wall inner tank having generally cylindrical side-wall portion and closed end portions that are transverse to the side-wall portion with elongated spindle members attached to and extending outwardly of the end portions of the inner tank generally coaxially with the central axis of the cylindrical inner tank, applying over at least a substantial portion of the exterior surface of the inner tank a first spacing material providing for substantially free passage of liquids along at least a substantial portion of the exterior surface of the inner tank, and applying over the first spacing material and at least a substantial portion of the inner tank an outer sheath of a material that is substantially rigid and liquid tight, with at least a portion of the outer sheath being adjacent to each of the spindle members and the outer sheath being spaced from at least a portion of the exterior surface of the inner tank by the first spacing material, the improvement comprising the steps of:

removing from the storage tank at least a substantial portion of the length of one of the spindle members from one of the end portions of the inner tank;

urging an end portion of the outer sheath overlying said one end portion of the inner tank away from said one end portion of the inner tank to form a space between the end portion of the outer sheath overlying said one end portion of said inner tank and the end portion of the inner tank, such that an aperture is created in the end portion of the outer sheath adjacent said one spindle member;

inserting a second spacing material through said aperture and into said space to maintain the end portion of the outer sheath overlying said one end portion of the inner tank spaced from said one end portion of the inner tank; and applying over said aperture a second sheath of a material that is substantially liquid-tight.

11. A method according to claim 10 further comprising the step of applying over said second spacing material an imperforate material to separate the subsequently applied second sheath from said second spacing material.

12. A method according to claim 11 wherein said imperforate material is a synthetic resin.

13. A method according to claim 10 wherein said method further comprises the steps of:

removing from said storage tank at least a substantial portion of the length of another one of said spindle members from its respective said end portion of said inner tank;

urging another end portion of the outer sheath away from its respective said end portion of said inner tank to form a second space between said another end portion of the outer sheath and its respective said end portion of the inner tank, such that a second aperture is created in said another end portion of said outer sheath;

inserting into said second space additional second spacing material to maintain said another end portion of said outer sheath spaced from its respective said end portion of said inner tank; and applying over said second aperture additional of said second sheath material.

14. A method according to claim 11 wherein said steps of removing further comprise removing outwardly extending portion of each of said spindle members from said end portions of the inner tank at a point along each of said spindle members proximal with the outer surface of the respective end portion of the outer sheath.

15. A method according to claim 14 wherein said point along each of said spindle members is substantially even with the outer surface of the respective said end portions of the outer sheath.

16. A method according to claim 10 wherein said second spacing material further comprises a perforate material.

17. A method according to claim 16 wherein said perforate material comprises a mesh material.

18. A method according to claim 10 wherein said second spacing material comprises a plurality of substantially rigid rods.

* * * * *